May 22, 1934.  H. L. MERRICK  1,959,873
CONTINUOUS WEIGHING APPARATUS
Filed July 27, 1932  3 Sheets-Sheet 1
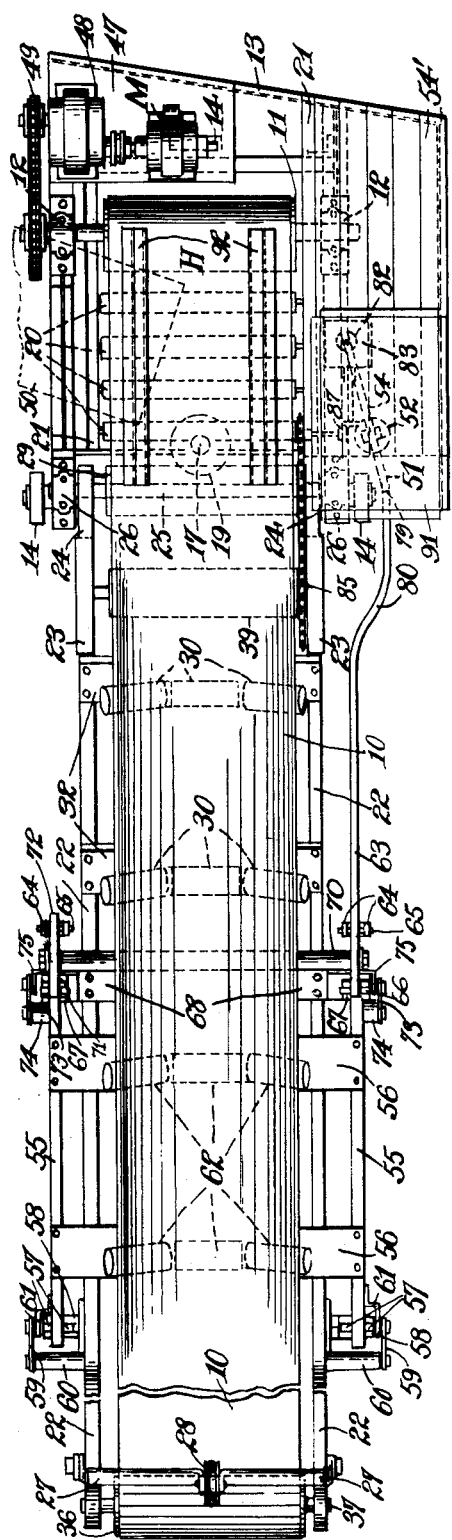
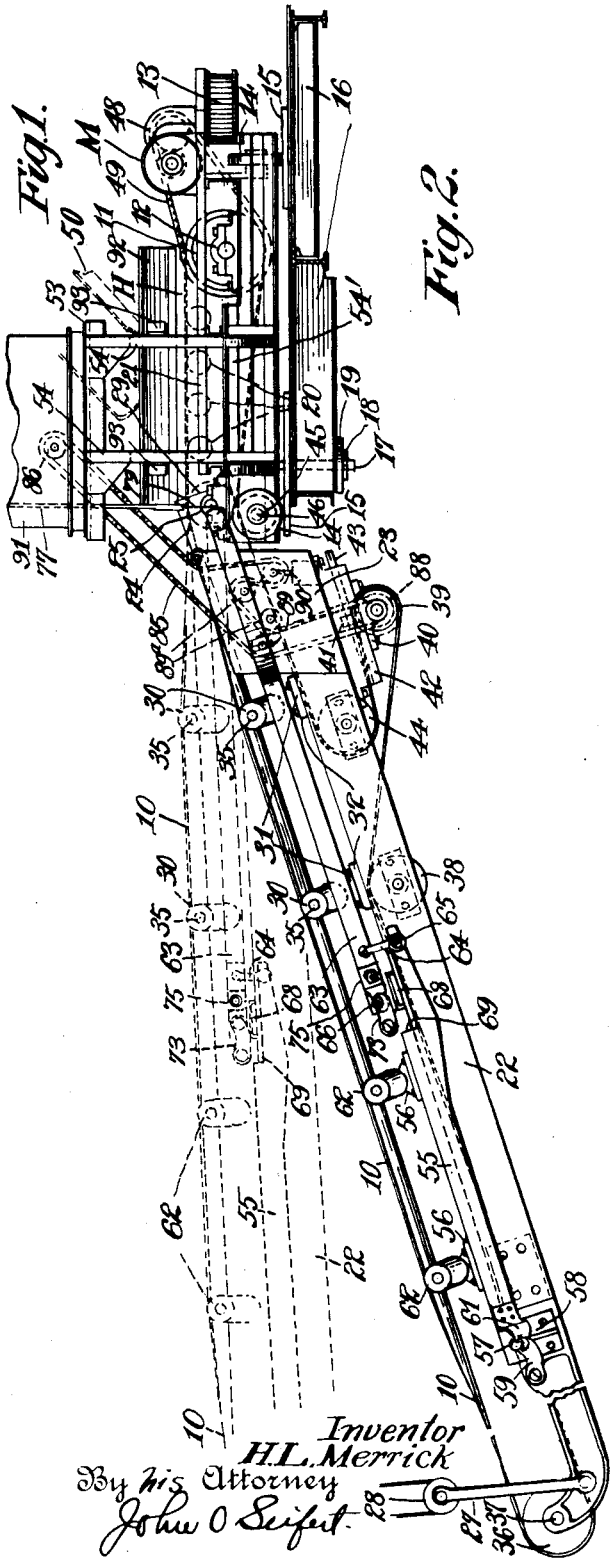
Inventor
H. L. Merrick
By his Attorney
John O. Seifert

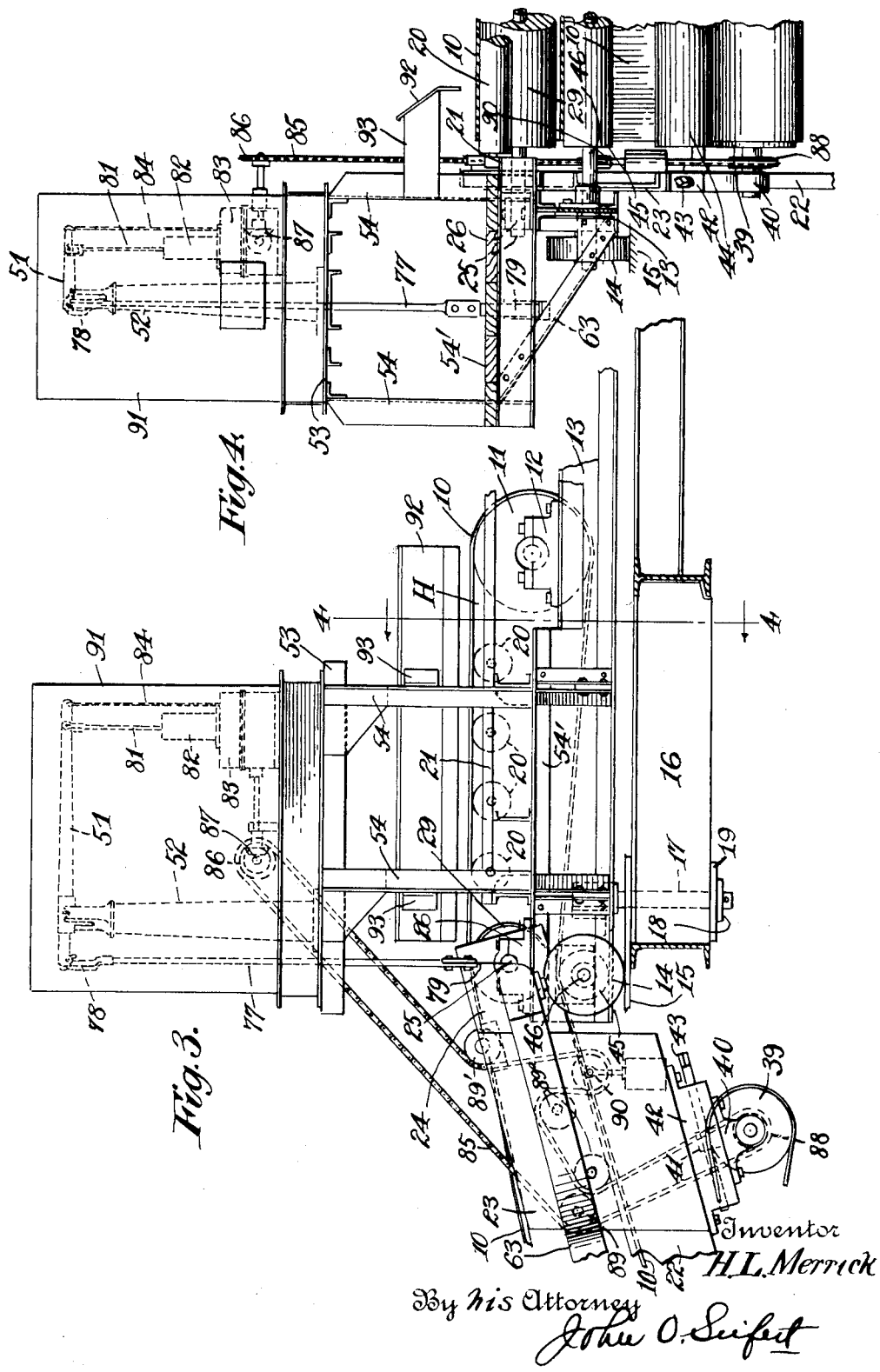

May 22, 1934.  H. L. MERRICK  1,959,873
CONTINUOUS WEIGHING APPARATUS
Filed July 27, 1932   3 Sheets-Sheet 3
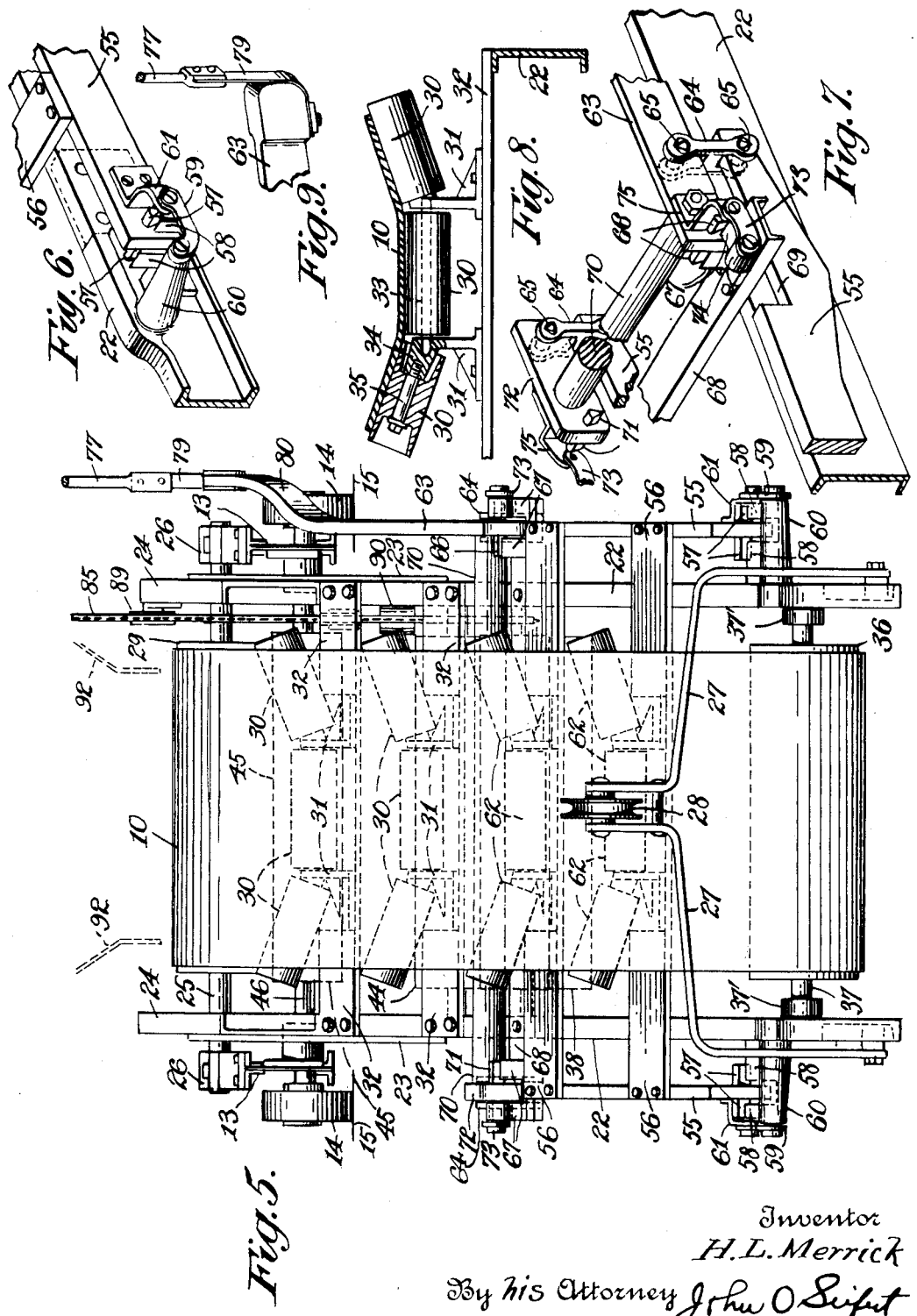
Inventor
H. L. Merrick
By his Attorney John O. Seifert Patented May 22, 1934

1,959,873

UNITED STATES PATENT OFFICE 1,959,873

CONTINUOUS WEIGHING APPARATUS

Herbert Lansing Merrick, Passaic, N. J.

Application July 27, 1932, Serial No. 625,051

18 Claims. (Cl. 198—39)

This invention relates to weighing mechanism for weighing material as it is carried by a mechanical conveyer either a belt, bucket or other type of conveying means, in which a portion of the conveyer is carried by a weighing lever connected with a scale beam having an automatic balancing device, such as a spring, or a plunger immersed in mercury, attached thereto. In this method of weighing an integrating device integrates and totalizes the product of the load carried by the conveyer and the travel of the conveyer, so that the result is the weight of material carried by the conveyer.

In the use of an adjustable conveyer support whereby the inclination or direction of travel of the conveyer may be changed, it is the practice as disclosed by Letters Patent No. 1,186,218 issued to me June 6, 1916, to carry the weighing mechanism from the support for the conveyer where it has been found to be inconvenient in certain instances to ascertain the weight carried by the conveyer due to the inaccessibility of the weighing mechanism, the weighing mechanism being usually mounted intermediate the ends of the conveyer support.

It is the object of the present invention to overcome this disadvantage by mounting the scale beam and the integrating device independently of the support for the conveyer and operatively connected thereto in such a manner that the changing of the direction of travel of the conveyer will not interfere with the correct and efficient operation of the weighing mechanism.

Another object of the invention is to mount the conveyer and weighing mechanism to permit adjustment of the conveyer about a horizontal axis in a vertical plane and with the weighing mechanism about a vertical axis without disturbing the functions of the weighing mechanism.

In carrying out the invention I pivotally mount the conveyer support at one end on a rotatable support upon which rotatable support the scale beam and the integrating device of the weighing mechanism are fixedly supported, the load of the conveyer being applied to the scale beam by a lever operatively mounted on the pivoted conveyer support to carry a portion of the conveyer and connected to the scale beam in alinement with the pivotal mounting of the conveyer support to permit of adjustment of the conveyer support to change the direction of travel of the conveyer without disturbing the functions of the scale beam. The integrating device is actuated in synchronism with the speed of travel of the conveyer in the usual manner.

In the drawings accompanying and forming a part of this application Figure 1 is a plan view of an embodiment of the invention.

Figure 2 is a side elevation looking at the bottom of Figure 1 and showing a movable section of the conveyer in different positions.

Figure 3 is an elevational view of the weighing mechanism and showing the connection thereof with the adjustable section of the conveyer.

Figure 4 is a cross sectional view taken on the line 4—4 of Figure 3 looking in the direction of the arrows with a portion of the conveyer broken away.

Figure 5 is an end view of the adjustable section of the conveyer support looking at the free end thereof with the conveyer inclining from said end.

Figure 6 is a detail view in perspective to show the pivotal mounting of a platform on the conveyer support constituting a portion of the connecting means between the weighing mechanism and conveyer.

Figure 7 is a detail view in perspective of the pivotal mounting of a weighing lever on the conveyer support constituting another portion of the connecting means between the weighing mechanism and conveyer, and also showing a link connection between the lever and the platform.

Figure 8 is a view partly in section of a set of a series of rollers to trough and support the conveyer from the conveyer support and platform, as shown in Figure 2; and Figure 9 is a detail view of the connection between the weighing lever and scale beam of the weighing mechanism.

Similar characters of reference designate like parts throughout the different views of the drawings.

The embodiment of the invention as illustrated in the drawings comprises an endless belt conveyer 10 having a section H with the upper stretch thereof traveling in a fixed horizontal plane by passing the belt around a drum 11 rotatably mounted in bearings 12 fixed to longitudinal members of a frame 13 supported to have adjustment about a vertical axis by wheels 14 engaging traction surfaces 15 mounted on a suitable support, such as the frame 16 shown in Figures 2 and 3, said adjustment of the frame 13 being about the axis of a shaft 17 fixed to and extended downward vertically from the frame 13 and through cross members of the frame 16, and held against longitudinal movement by a washer 18 on the shaft abutting a shoulder 19 on the members 13, 16 of the frame, the washer being held on the shaft by a pin extended through the shaft. The upper horizontal stretch of the conveyer is supported by a series of rollers 20 rotatably mounted in bearings fixed to parallel horizontal sills 21 carried by the frame 13 for approximately the entire length of the horizontal stretch H. The remaining section of the conveyer is adapted to be supported to have adjustment in a vertical plane to change the direction of travel thereof by supporting said section of the conveyer upon a pivoted frame comprising a pair of parallel members 22 pivotally mounted at one end by plates 23 fixed to said members 22, said plate being of greater width and extending above the members 22, and having members 24 connected thereto to project beyond the ends of the members 22 parallel to and in a plane above said members, and said members 24 loosely engaged on a shaft 25 fixedly mounted in bearing members 26 carried by the longitudinal frame members 13, whereby the conveyer supporting members 22 may be adjusted in a vertical plane about the shaft 25 by a winch mechanism, not shown, operatively connected to the frame by a block and tackle including a pulley 28 carried by a pair of angle members 27 pivotally connected to the free ends of the conveyer support 22 with the free ends bent to form a mounting for the support for the pulley 28, as shown in Figure 5. The upper stretch of the conveyer belt as it leaves the series of rollers 20 passes over a roller 29 loosely mounted on the shaft 25 and is supported from the frame members 22 by a series of troughing rollers 30 arranged in sets of three in the present instance rotatably carried by brackets 31 mounted on cross members 32 of the frame members 22 with the end rollers extending in an oblique direction away from the middle roller which is mounted to rotate in a horizontal plane between the brackets 31 on a spindle 33 fixed in the brackets, the brackets being arranged with protuberances 34 extended in an oblique direction from the mounting of the supporting spindle 33 for the middle roller and adapted to carry spindles 35 upon which the end rollers 30 are rotatably mounted, as shown in Figure 8. After leaving the rollers 30 the conveyer belt 10 passes around a drum 36 fixed to a shaft 37 rotatably mounted in bearings arranged at the free ends of the frame members 22 and retained against longitudinal movement by collars 37', as shown in Figures 2 and 5, and from said drum 36 the travel of the conveyer belt is reversed into the lower stretch thereof where it passes over and is supported by a roller 38 rotatably carried by and extending between the frame members 22. To take up slack in the conveyer the lower stretch after leaving the roller 38 passes around an idler or take-up roller 39 rotatably mounted in bearing brackets 40 having an extended portion 41 slidably mounted in a guideway of carrier blocks 42 fixedly mounted on the underside of the conveyer support 22, the bearing brackets 40 being adjustable relative to said blocks by lead screws 43 rotatably mounted and held against longitudinal movement in the carrier blocks and having threaded connection with the extended portions 41 of the bearing brackets 40, said screws having a slot in one end to facilitate the rotation of the same by a screw-driver or other suitable instrument. To provide an anchorage to take up slack in the belt by the adjustment of the roller 39 the direction of travel of the conveyer belt is reversed as it passes around the roller and passed around a drum 44 and from said latter drum travels in a direction toward the pivotal mounting of the conveyer support 22 where it passes over and is supported by a roller 45 loosely mounted on a shaft 46 fixedly mounted in the lateral members of the frame 13, the ends of said shaft extending beyond the frame members and rotatably carry the wheels 14. From the roller 45 the belt travels toward and around the roller 11, which roller comprises the driver for the conveyer belt. The roller or drum 11 is driven from an electric motor M supported upon a platform 47 arranged on the frame 13, as shown in Figure 1, the motor being connected to the roller 11 through speed reducing gearing enclosed in a suitable housing, as indicated at 48, and a sprocket chain 49 passing around sprocket wheels fixed on the shaft of the roller 11 and a shaft of the speed reducing gearing, as shown in Figure 1.

The material transported by the conveyer belt 10 is delivered to the horizontal upper stretch section H from a hopper (not shown) by a chute 50, shown in dotted lines in Figures 1 and 2, and is weighed while being transported relative to the pivoted conveyer support 22 by weighing means which is not affected or disturbed by the angular adjustment of said conveyer support. The weighing means comprises a scale beam 51 pivotally supported by knife edge bearings on a column 52 mounted on a platform 53 supported in elevated position by standards 54 from a platform 54' supported by and extended laterally from the frame 13. The short end of the scale beam is connected to a support, in the nature of a weighing platform, for a portion of the conveyer traveling relative to the pivoted conveyer support 22 embodying a platform comprising parallel members 55 connected by cross members 56 and pivotally supported at one end from the frame members 22 by knife edge pivots 57 extended from the opposite sides of each member 55 and engaged in V-shaped recesses arranged in the legs of bifurcated brackets 58 carried by the frame members 22 of the conveyer support. To prevent longitudinal movement of the platform it is positively connected to said frame members 22 by links 59 pivotally connected at opposite ends to studs 60 projecting laterally from the frame members 22 and angle brackets 61 carried by the platform members 55 to extend about the outer legs of the brackets 58, as shown in Figure 6. The conveyer belt is carried by the platform 55 in the form of a trough similar to the portion of the conveyer supported by the rollers 30 of the conveyer support 22, by a series of similar troughing rollers 62 arranged in sets of three and mounted on the cross members 56 in a manner similar to the mounting of the rollers 30, as shown in Figure 8. The ends of the platform members 55 opposite to the ends pivotally mounted on the frame members 22 are connected to and suspended from a lever 63 by a link 64 having perforations in the opposite ends arranged for the engagement of knife edge pivots projecting laterally from said lever 63 and the adjacent platform member 55, as at 65 in Figure 7. The lever 63 has a fulcrum support at one end on the member of the conveyer support 22 adjacent the link connection 64 so that the lever will extend in alinement with the adjacent frame member 55 connected to the link 64 in the form of knife edge pivots 66 extended from the opposite sides thereof engaging V-shaped recesses in the legs of bifurcated brackets 67 mounted on the ends of a connecting member 68 of the frame member 22 of the conveyer support with said ends of said connecting member extended beyond said frame members, the ends of the platform members 55 being cut-away, as at 69, to permit free movement of said platform members on their fulcrum supports 57. To prevent distortion of the platform 55 due to the unbalanced support thereof by the links 64 from the lever 63, said lever 63 is provided with a fulcrum support from the opposite member of the conveyer support 22, comprising a cross member 70 connected at one end to the lever 63 adjacent the knife edge pivots 66, the opposite end of said member having a fulcrum support upon the end of the cross member 68 opposite to the support of lever 63 by knife edge pivots 71 carried by a block 72 fixed to the end of the cross member 70 and said pivots 71 engaging bearings in brackets similar to brackets 67 mounted on the cross member 68. The adjacent platform member 55 extends in alinement with the block 72 and connected to and suspended from said block by links similar in structure to the links 64 and connected to the block and platform member by knife edge pivots. To prevent longitudinal movement of the lever 63 due to the travel of the conveyer links 73 are pivotally connected at one end to portions 74 extended from the outer legs of the brackets 67, and at the opposite end to angle brackets 75 fixed to the lever 63 and block 72.

The end of the lever 63 opposite to its fulcrum support on the conveyer supporting frame 22 is extended to a position in alinement with the pivot supporting shaft 25 for the conveyer supporting frame 22, and is substantially maintained in said position by suspending the same from the short end of the scale beam 51 by a rod 77 releasably connected to the scale beam by a hook portion 78 and flexibly connected to the lever 63 by a strap 79 secured at the opposite ends to the rod 77 and lever 63, as shown in Figure 9. The end of the lever 63 connected to the rod 77 is offset outwardly, as at 80 in Figures 1 and 5, to position the free end thereof in vertical alinement with the short end of the scale beam, as clearly shown in Figure 1, to assure the even transmission of movement of the lever 63 to the scale beam, whereby adjustment of the conveyer about its pivot supporting shaft 25 will not transmit any movement to the scale beam as there is no horizontal or vertical movement at the point of connection between the scale beam and lever.

The scale beam is maintained in a normal position of equilibrium and is adapted to move out of its position of equilibrium proportional to the weight of a load on that portion of the conveyer traveling over the platform 55 by suitable balancing mechanism, shown as comprising a plunger connected by a link 81 to the scale beam and suspended in a receptacle 82 containing mercury to resist the force of the weight of the load on the weighing lever 63 and automatically balance the load, the increase or decrease of the load on said lever proportionally raising or lowering the plunger in the mercury until the loss or gain in buoyancy compensates for the variations in the load.

To register and indicate the weight of the load of the conveyer traveling over the platform 55 integrating means, shown in a general way at 83, is mounted upon the platform 53 and is operatively connected by a link 84 to the long end of the scale beam 51, a rotatable element being connected with and driven in synchronism with the travel of the conveyer, by a sprocket chain 85 passing around a sprocket wheel 86 rotatably supported on the platform 53 and connected to the integrating means by gearing 87, and a sprocket wheel 88 fixed on the shaft of the conveyer roller 39, the sprocket chain 85 from wheel 86 traveling over a wheel 89 to the sprocket wheel 88, and from the latter over a pair of wheels 89a and a wheel 89' rotatably carried by a plate member 23 of the conveyer support to the wheel 86 with a loop portion between wheels 89a and wheel 89' to compensate for variations in the length of the chain effected by adjustment of the conveyer support 22, the slack being taken up by a weighted wheel 90. The integrating means continuously totalizes the product of two quantities, one proportional to the weight of the load on the lever 63 and the other to the travel of the material, but as this does not constitute an essential feature of the invention detail description is not deemed necessary. The scale beam and integrating means are housed in a suitable casing 91 supported on the platform 53.

It will readily be seen that the portion of conveyer supported by the pivoted frame 22 may be adjusted in a vertical plane on the horizontal axis 25 and in a horizontal plane on the vertical axis 17 without impairing or affecting the function of the weighing mechanism by maintaining the fulcrum of the scale beam in a horizontal position in all of said adjusted positions.

To prevent the scattering of material onto the platform 54' as it is delivered from the chute 50 a plate 92 is supported on the standards 54 by arms 93, as shown in Figures 2 to 4, inclusive, to direct the material onto the conveyer stretch H.

Variations may be made in construction and arrangement of parts without departing from the scope of the invention, and portions of the invention may be used without others and come within the scope of the invention.

Having thus described my invention, I claim:

1. The combination of a traveling conveyer, a movable support for the conveyer adjustable to alter the direction of travel of the conveyer, and weighing mechanism embodying balancing means fixedly mounted relative to the conveyer support, and means operatively connected with the balancing means to carry a portion of the conveyer adapted to be conjointly adjusted with the conveyer support to apply the load of the conveyer traveling relative to said conveyer carrying means to the balancing means of the weighing mechanism whereby adjustment of the conveyer support to effect alteration in the direction of travel of the conveyer will not disturb the functions of the weighing mechanism.

2. The combination of a traveling conveyer, a movable support for the conveyer adjustable to alter the direction of travel of the conveyer, and weighing mechanism embodying balancing means fixedly mounted relative to the conveyer support, and means mounted on the conveyer support to carry a portion of the conveyer and connected to the balancing means to apply the load of the conveyer traveling relative to said conveyer carrying means to said balancing means whereby adjustment of the conveyer support to effect alteration in the direction of travel of the conveyer will not disturb the functions of the balancing means of the weighing mechanism.

3. The combination of a traveling conveyer, a support for the conveyer pivotally mounted to alter the direction of travel of the conveyer, and weighing mechanism embodying balancing means fixedly mounted relative to the pivotal mounting of the conveyer support, and means mounted on the conveyer support to carry a portion of the conveyer and connected to the balancing means to apply the load of the conveyer traveling relative to said conveyer carrying means of the weighing mechanism to said balancing means whereby adjustment of the conveyer support to effect alteration in the direction of travel of the conveyer will not disturb the functions of the balancing means of the weighing mechanism.

4. The combination of a traveling conveyer, a movable support for the conveyer adjustable to alter the direction of travel of the conveyer, and weighing mechanism embodying balancing means fixedly mounted relative to the conveyer support, means to carry a portion of the conveyer adapted to be conjointly adjusted with the conveyer support and connected to the balancing means to apply the load of the conveyer traveling relative to said conveyer carrying means to said balancing means, and integrating means connected to the balancing means and actuated in synchronism with the speed of travel of the conveyer.

5. The combination of a traveling conveyer, a movable support for the conveyer adjustable to alter the direction of travel of the conveyer, and weighing mechanism embodying a platform movably mounted on the conveyer support and adapted to carry a portion of the conveyer, balancing means fixedly mounted relative to the conveyer support and means carried by the conveyer support to participate in the adjusting movements of said support and operatively connected to the platform and balancing means of the weighing mechanism to apply the load of the conveyer traveling relative to the platform to the balancing means whereby adjustment of the conveyer support to effect alteration in the direction of travel of the conveyer will not disturb the functions of the weighing mechanism.

6. In weighing mechanism, a conveyer having one section supported to travel in a fixed plane and another section supported to have adjustment in angular relation to the fixed section, balancing means mounted relative to the fixed section of the conveyer, and means mounted to carry a portion of the adjustable section of the conveyer and connected to the balancing means to apply the load carried by the portion of the conveyer traveling relative to said carrying means to the balancing means.

7. The combination of a traveling conveyer and weighing mechanism as claimed in claim 2, wherein the conveyer carrying means of the weighing mechanism is connected to the balancing means by flexible means extending in a substantially vertical plane in the adjusted positions of the conveyer support.

8. The combination of a traveling conveyer, a movable support for the conveyer adjustable to alter the direction of travel of the conveyer, and weighing mechanism embodying a platform pivotally supported at one end by the conveyer support and adapted to carry a portion of the conveyer, balancing means fixedly mounted relative to the conveyer support, and a lever pivotally mounted on the conveyer support connected to and supporting the end of the platform opposite to the end supported by the conveyer support to permit of parallel movement of the platform and lever relative to each other in a vertical plane and connected to the balancing means to apply the load carried by the portion of the conveyer traveling relative to the platform to said balancing means.

9. The combination of a traveling conveyer and weighing mechanism as claimed in claim 8, wherein the lever is connected to the platform at one side of and adjacent to the pivotal mounting of the lever on the movable support.

10. The combination of a traveling conveyer and weighing mechanism as claimed in claim 8, wherein the lever is pivotally mounted at one end on the conveyer support and at the opposite end connected to the balancing means of the weighing mechanism with the lever extending in a plane parallel to the conveyer support in all adjusted positions of said support.

11. The combination of a traveling conveyer and weighing mechanism as claimed in claim 8, wherein the platform is supported by the lever of the weighing mechanism intermediate the connections of said lever with the conveyer support and balancing means.

12. The combination of a traveling conveyer, a support for the conveyer mounted to have adjustment about vertical and horizontal axes, and weighing mechanism embodying balancing means arranged to participate in the adjustment of the conveyer support about the vertical axis, and means adapted to carry a portion of the conveyer and be conjointly adjusted with the conveyer support and connected to the balancing means to apply the load carried by the portion of the conveyer traveling relative to said conveyer carrying means to the balancing means whereby adjustment of the conveyer support about the horizontal axis will not disturb the functions of the balancing means.

13. The combination of a traveling conveyer and weighing mechanism as claimed in claim 8, wherein the platform is supported from the lever by a link having knife edge pivot connections with the platform and lever to permit the platform and lever to have lateral movement relative to each other.

14. The combination of a traveling conveyer and weighing mechanism as claimed in claim 5, wherein the platform and the means of the weighing mechanism carried by the conveyer support extend parallelly of said conveyer support and participate in the adjusting movements thereof.

15. The combination of a traveling conveyer, a support for the conveyer pivotally mounted at one end to alter the direction of travel of the conveyer, and weighing mechanism embodying a platform pivotally supported at one end by the conveyer support intermediate the ends of said support and adjusted to carry a portion of the conveyer, balancing means fixedly mounted relative to the pivoted end of the conveyer support, and a lever pivotally carried at one end by the conveyer support to support the free end of the platform with the opposite end extended relative to the pivotal mounting of the conveyer support and connected to the balancing means to apply the load carried by the portion of the conveyer traveling relative to the platform to the balancing means whereby adjustment of the conveyer support to effect alteration in the direction of travel of the conveyer will not disturb the functions of the balancing means.

16. The combination of a traveling conveyer and weighing mechanism as claimed in claim 3, wherein the connection between the balancing and conveyer carrying means of the weighing mechanism extends in a vertical plane in alinement with the pivotal mounting of the conveyer support.

17. The combination of a traveling conveyer, a support mounted to have adjustment about a vertical axis, members pivotally mounted on the support to extend radially from and having angular adjustment relative to the support, conveyer carrying means supported by the support and pivoted members, weighing mechanism embodying balancing means carried by the support, and means movably mounted on the pivoted members to carry a portion of the conveyer traveling relative to said members and connected to the balancing means to apply the load of the conveyer to said balancing means whereby adjustment of the pivoted members to alter the direction of travel of the conveyer will not disturb the functions of the balancing means.

18. The combination of a traveling conveyer, a support mounted to have adjustment about a vertical axis, members pivotally mounted on the support to have adjustment in angular relation therewith, an endless conveyer supported by the rotatable support and pivoted members, the section of the conveyer supported by the pivoted members being conjointly adjustable therewith, weighing mechanism embodying a platform movably mounted on the pivoted conveyer carrying members to carry a portion of the conveyer traveling relative to the pivoted members, balancing means carried by the adjustable support, and a lever fulcrumed on the pivoted members and connected to the platform and balancing means to apply the load of the conveyer traveling relative to the platform to the balancing means whereby adjustment of the pivoted members to alter the direction of travel of the section of the conveyer supported thereby will not disturb the functions of the balancing means.

HERBERT LANSING MERRICK.